United States Patent [19]

Park

[11] Patent Number: 5,550,535
[45] Date of Patent: Aug. 27, 1996

[54] BANK BALANCE NOTIFICATION BY WRISTWATCH PAGER

[75] Inventor: Mike C. Park, Portland, Oreg.

[73] Assignee: Seiko Communications Holding N.V., Netherlands Antilles

[21] Appl. No.: 930,953

[22] Filed: Aug. 14, 1992

[51] Int. Cl.⁶ ........................................ H04Q 7/14
[52] U.S. Cl. ............... 340/825.440; 340/825.340; 340/825.310; 340/825.270
[58] Field of Search .................. 340/825.31, 825.34, 340/825.44, 825.27; 379/56, 57; 235/379

[56] References Cited

U.S. PATENT DOCUMENTS

| | | | |
|---|---|---|---|
| 4,713,808 | 12/1987 | Gaskill et al. | 370/94.1 |
| 4,885,802 | 12/1989 | Ragan | 455/182.1 |
| 4,897,835 | 1/1990 | Gaskill et al. | 370/94.1 |
| 5,016,273 | 5/1991 | Hoff | 340/825.44 |
| 5,065,452 | 11/1991 | Duckeck et al. | 455/226 |
| 5,146,217 | 9/1992 | Holmes et al. | 340/825.44 |
| 5,151,694 | 9/1992 | Yamasaki | 340/825.44 |
| 5,221,838 | 6/1993 | Gutman et al. | 235/379 |

OTHER PUBLICATIONS

Advisor Message Recever; Motorola; 1990.

*Primary Examiner*—Michael Horabik
*Assistant Examiner*—Edwin C. Holloway, III
*Attorney, Agent, or Firm*—Elmer Galbi

[57] ABSTRACT

A wrist watch radio pager which includes a microprocessor and which receives different types of messages. Normal messages received by the wrist watch pager are displayed in a conventional fashion. However, one type of message is transmitted together with a code which indicates that the message is a "private" or "secure" message. A private message can for example be used to automatically transmit a user's bank balance to the wrist watch pager. Private messages are not automatically displayed on the wrist watch pager as are normal messages. When a private message arrives at the pager, it is stored in the pager's memory. When the user seeks to display the message, a special display appears which asks for entry of a security code. The security code entered by the user must match a security code previously delivered to the pager by way of a security code message. The security code is entered in the same manner that the time digits on a digital watch are entered. If the correct security code is entered, the secure message is displayed. If an incorrect code is entered a preset number of times, the message is erased from the memory.

10 Claims, 4 Drawing Sheets

BANK BALANCE NOTIFICATION BY WRISTWATCH PAGER

FIELD OF THE INVENTION

The present invention relates to radio pagers and more particularly to providing special types of information by means of a radio pager system.

BACKGROUND OF THE INVENTION

U.S. Pat. Nos. 4,713,808 (Gaskill) and 4,897,835 (Gaskill) show a radio pager in the form factor of a wrist watch. Such a radio pager is being commercially marketed by Seiko Telecommunication Systems, of Portland Oreg. under the trademark RECEPTOR.

The RECEPTOR pager includes a programmable computer. This computer is used to perform a variety of operations in the pager. For example U.S. Pat. No. 5,065,432 (Gaskill) shows the microprocessor and describes some of the programs performed. application Ser. No. 07/512,237 filed Apr. 18, 1990 entitled "Method and Apparatus for Accurate Time Maintenance", now abandoned shows other programs that can be executed by the microprocessor in the pager.

In the systems shown in the above references patents and patent applications and in the commercial RECEPTOR pager system, messages are sent to wristwatch pagers from a central message clearing house. The messages are sent to the wristwatch pagers using a time slot protocol of the type shown in U.S. Pat. Nos. 4,713,808 and 4,897,835. This protocol can accommodate different types of data as shown in application Ser. No. 07/515,810 filed Apr. 27, 1990 now issued as U.S. Pat. No. 5,166,932.

In the system described in the above references, messages are sent from ordinary telephones, first to a message clearinghouse, then from the clearinghouse to radio transmitters and finally from the radio transmitters to the wristwatch pager. As shown in U.S. Pat. No. 5,166,932 information can be sent to the wrist watch pagers from a computer or from ordinary telephones.

SUMMARY OF THE PRESENT INVENTION

The present invention utilizes a wrist watch radio pager which includes a microprocessor and which receives different types of messages. Normal messages received by the wrist watch pager are displayed in a conventional fashion. However, one type of message is transmitted together with a code which indicates that the message is a "private" or "secure" message. A private message can for example be used to automatically transmit a user's bank balance to the wrist watch pager. Private messages are not automatically displayed on the wrist watch pager as are normal messages. When a private message arrives at the pager, it is stored in the pager's memory. When the user seeks to display the message, a special display appears which asks for entry of a security code. The security code entered by the user must match a security code previously delivered to the pager by way of a security code message. The security code is entered in the same manner that the time digits on a digital watch are entered. If the correct security code is entered, the secure message is displayed. If an incorrect code is entered a preset number of times, the message is erased from the memory.

DETAILED DESCRIPTION OF THE DRAWINGS

DETAILED DESCRIPTION OF A PREFERRED EMBODIMENT OF THE INVENTION

Figure 1A:
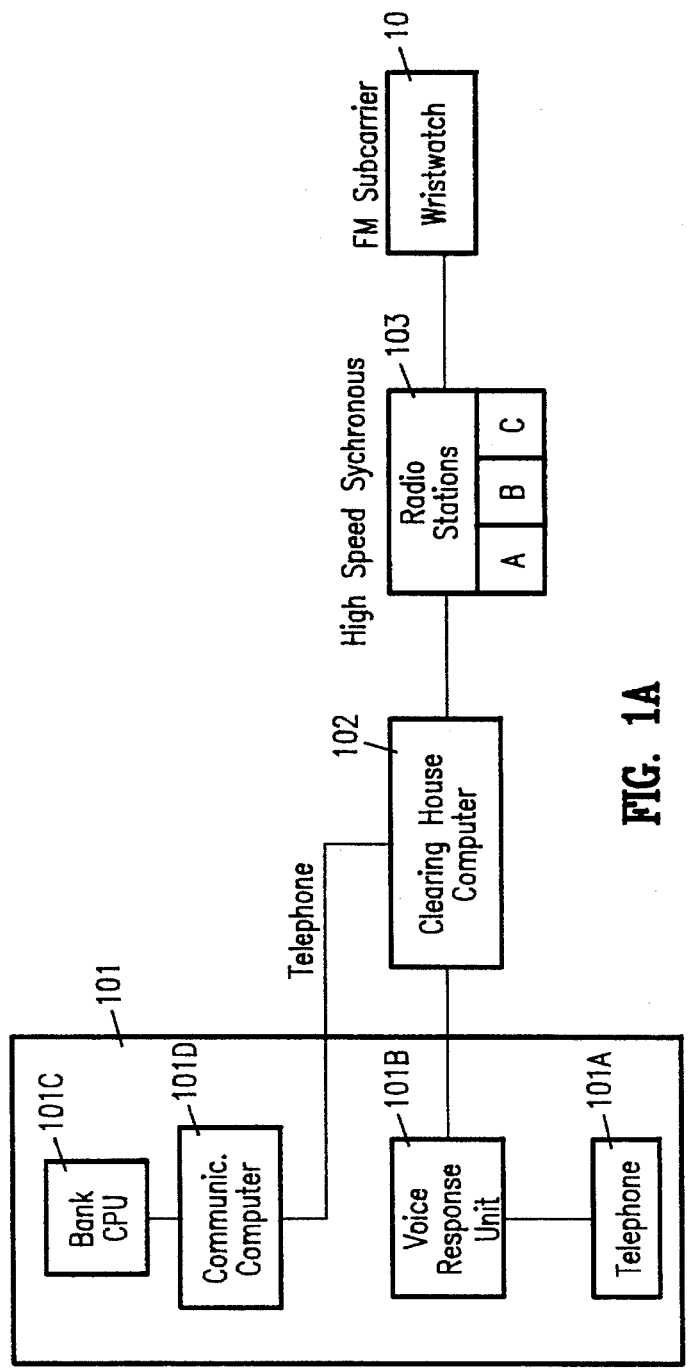
FIG. 1A is an overall diagram of the system.
Figure 1B:
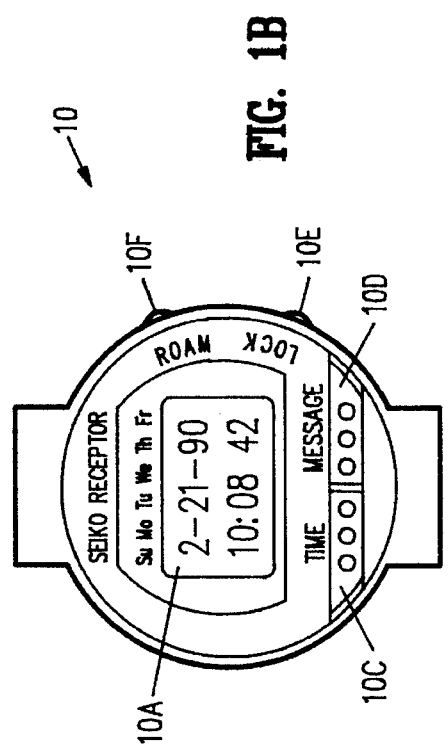
FIG. 1B is a diagram of the wrist watch pager.

A wrist watch radio pager 10 is shown in FIG. 1. In the embodiment of the invention shown herein three types of messages can be transmitted to pager 10. The first type of message is a normal paging message which is stored and displayed in the normal manner. The second type of message is what is herein termed a "secure" message which is only displayed after the user has entered a code number.

As will be explained in detail hereinafter, a user's bank balance is periodically sent to the wrist watch pager. A secure message is used when a bank balance is sent to the pager. In this way the user's bank balance will not be automatically displayed, thereby raising the possibility that it will be seen by someone other than the user.

When a secure message is sent to the wrist watch pager 10, only the authorized user will be able to retrieve the message because the message will only be displayed after the user has entered a four digit code. The four digit code number is entered into the watch in the same manner that the watch is set to a particular time. Namely, first the watch is put in a set mode. Then the four digits are set sequentially. First the first digit is set by pushing buttons 10C until the correct number is displayed. Next button 10D is pushed to move on to the next digit. Again button 10C is pushed repeatedly until the second digit displays the correct number. Then button 10D is pushed to move on to the next digit, etc.

The pager includes a display 10A, a wristband antenna 10B (not shown) and control buttons 10C, 10D, 10E and 10F. Pager 10 includes a radio receiver such as that shown in U.S. Pat. No. 4,885,802 entitled "Wristwatch Receiver Architecture" (Ragan) issued Dec. 5, 1989.

Messages are transmitted to the pager 10 via FM subcarrier using a system such as that U.S. Pat. No. 4,713,808 entitled "Watch Pager System and Communication Protocol" issued Dec. 15, 1987 and U.S. Pat. No. 4,897,835 entitled "High Capacity Protocol Using Multi Station Capability" issued Jan. 30, 1990.

An overall diagram of the system is shown in FIG. 1A. The system consists of an input subsystem 101, a message clearinghouse 102, radio stations 103A, B, and C, and wristwatch pager 10. Messages are transmitted from the input subsystem 101, to the clearinghouse 102 by telephone. Messages are transmitted from the clearinghouse to the radio stations using a synchronous data link since timing considerations are very important in this transmission. As explained in U.S. Pat. No. 4,897,835 "High Capacity Protocol with Multistation Capability", by synchronizing the various radio stations one can obtain very important advantages. The transmission from radio stations 103A, 103B and 103C to the wrist watch pager 10 is via FM subcarrier as explained in U.S. Pat. No. 4,713,808, entitled "Watch Pager System and Communication Protocol".

In the present embodiment of the invention, the input subsystem 101 includes a telephone 101A, that provides inputs to a voice response unit 101B. Telephone 101A and voice response unit 101B operate as shown and described in U.S. Pat. Nos. 4,713,808 and 5,016,273.

The present invention provides a second input to the clearinghouse 102 via Bank CPU 101C and communication computer 101D which will be explained in more detail later.

Figure 2:
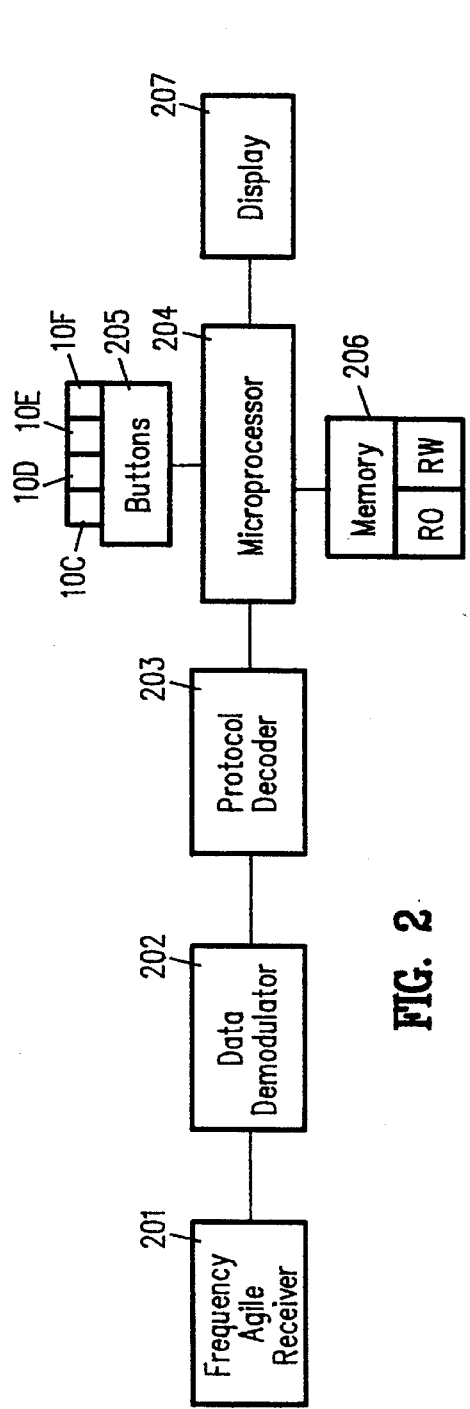
FIG. 2 is a block diagram of the electronics in the wrist watch pager.

FIG. 2 shows a block diagram of the electronic circuitry in wrist watch pager 10. There is a frequency agile receiver 201, a data demodulator 202, a protocol decoder 203, a microprocessor 204. Microprocessor 204 has input buttons subsystem 205 which include buttons 10C, 10D, 10E and 10F, display 207 and memory 206. Memory 206 is divided into a nonvolatile read only section RO for storing a program according to which the microprocessor operates and a read-write section RW for storing messages and other data.

The frequency agile receiver 201 receives radio signal and it is constructed as shown in U.S. Pat. No. 4,885,802 "Wristwatch Receiver Architecture". The data demodulator 202 and the protocol decoder 203 demodulate the FM subcarrier and decode the protocol. They can be constructed as shown in U.S. Pat. No. 4,713,808 and in U.S. Pat. No. 5,166,932.

The microprocessor 204, button subsystem 205, memory 206 and display 207 are conventional. Microprocessor 204 can for example be a microprocessor in the SMC 6200 family which is commercially marketed by S-MOS Corporation, San Jose, Calif. and by the Seiko Corporation, Tokyo Japan.

Figure 3A:
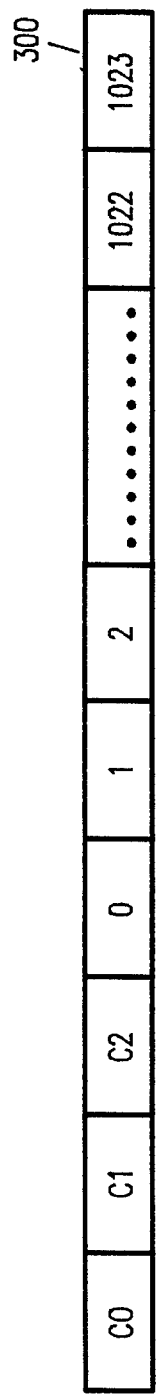
FIG. 3A and 3B are diagrams of some of the information in a time slot.
Figure 3B:
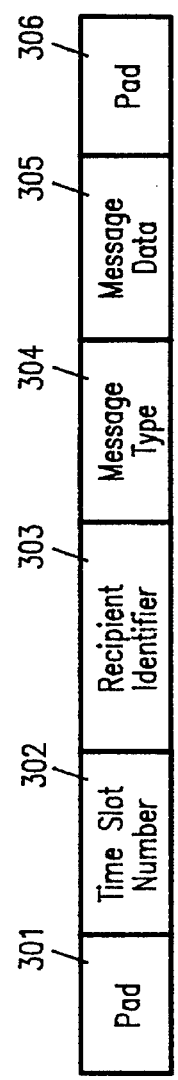

Messages are transmitted from radio stations 103A, B and C to the wristwatch 10 using a time slot protocol as described in U.S. Pat. Nos. 4,713,808 and 4,897,835. FIG. 3A shows a subframe of the message transmission protocol. As Shown in FIG. 3A each subframe consists of three control slots C0, C1 and C2 followed by 1024 message slots numbered 0 to 1024. The structure of the data in each message time slot is shown in FIG. 3B. Padding bits 301 and 306 are included on each side of the data in order to correctly position and identify the data. While other data may be included, the data relevant to the present invention includes a time slot number 302, a recipient ID number 303, a Message Type 304, and message data 305.

With respect to the present invention, three types of messages are important. These three types of message are herein designated type A, type B and Type C messages as follows:

Type A: normal paging message.

Type B: private message.

Type C: Send security code to the wrist watch pager.

Type A messages are normal paging messages. When an type A message is received by the wristwatch pager, the display changes from a normal time display to a display of the message.

Type B messages are secure messages. When a type B message is received, a special screen display appears as shown in block 406 in FIG. 4. Initially this screen shows four zero digits. These digits are set to a code number in the same manner that the time is into a digital wristwatch.

Namely, after the display appears, each time button 10C is pushed the first digit is incremented by one. When this digit has the desired value button 10F is pushed. Button 10C can then be pushed to increment the second digit to the desired value. This process continues until all four digits are set to the desired value. Pressing button 10D after the fourth digit is set to the desired value, indicates to the microprocessor that the number is set to the desired value.

Type C messages are used to send the security code to the wristwatch pager. When the pager receives a Type C message the security code is stored in a designated location in RW section of memory 206. It is noted that for convenience the user can use the same PIN number as the user uses for Bank Card Access to his account.

Figure 4A:
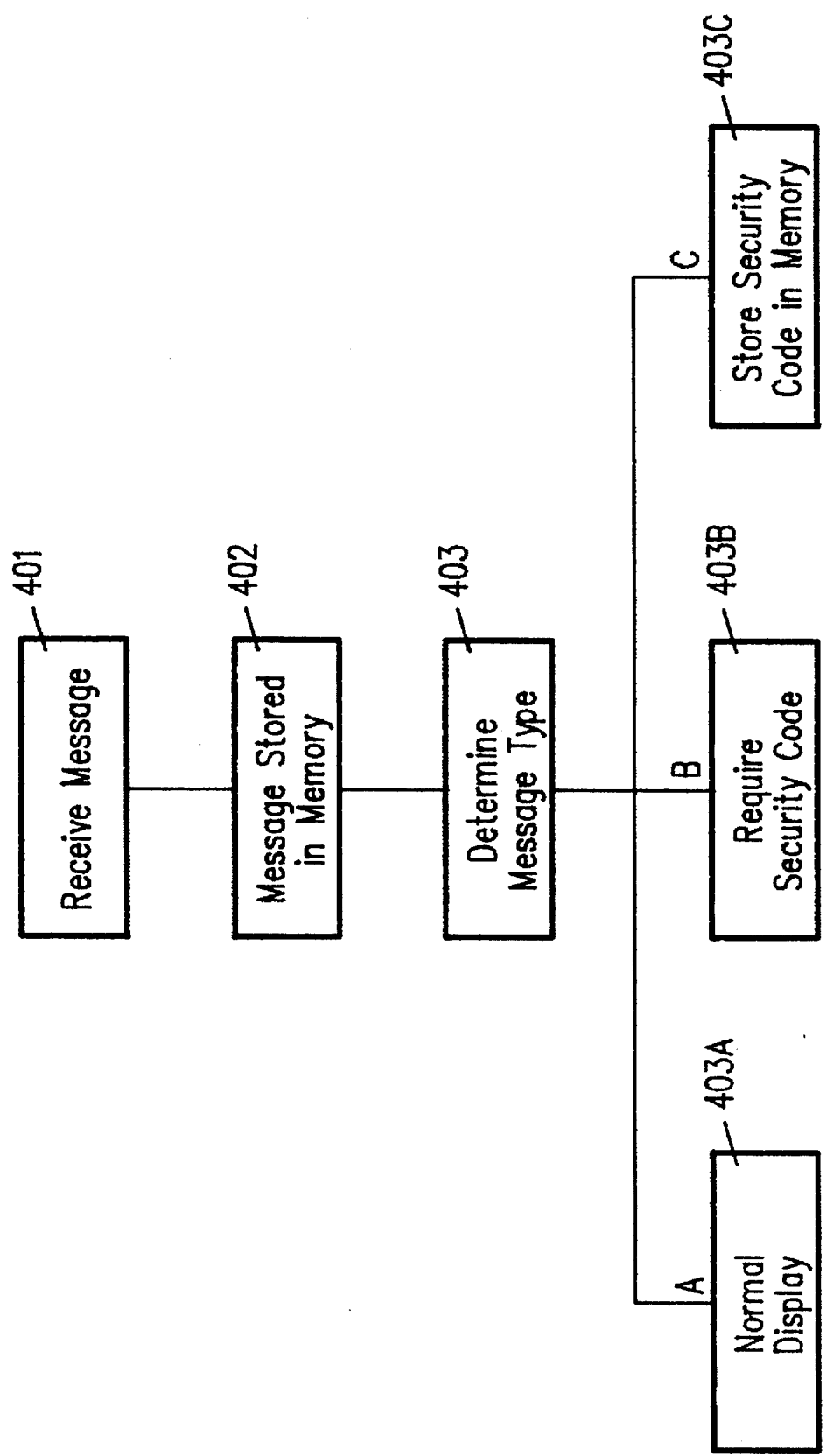
FIGS. 4A and 4B are flow diagrams of a program in the microprocessor which is part of the wrist watch pager.

FIG. 4A shows a block diagram of the program executed by microprocessor 204 receives a message. As indicated by block 402, first the message is stored in RW section of memory 206. Next the type field of the message is interrogated as indicated by block 403 to determine the type of message. Depending on the type of message either subprogram 403A, 403B or 403C is activated.

Figure 4B:
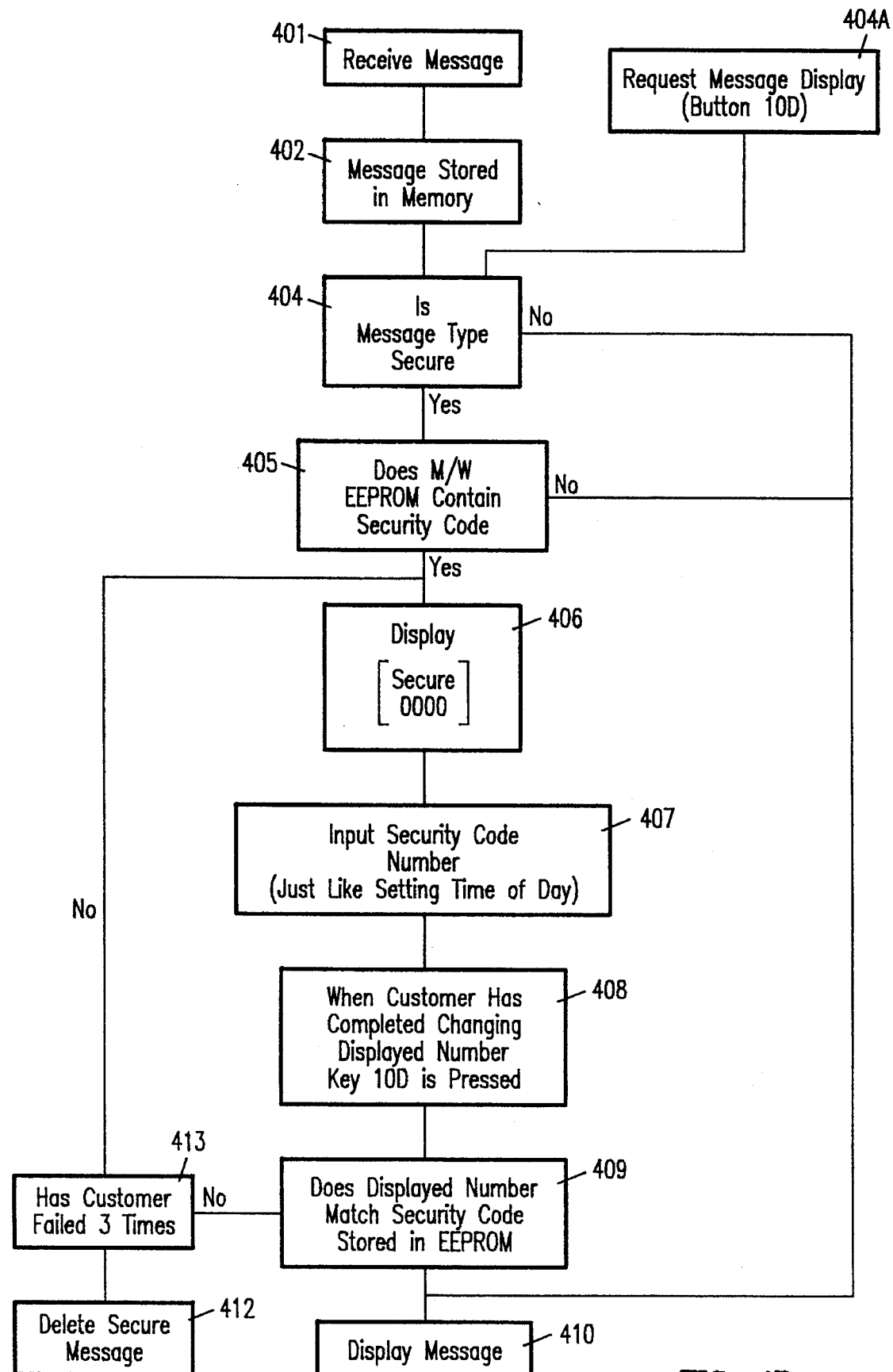

A more detailed block diagram of the program executed by subroutines 403A, 403B and 403C is shown in FIG. 4B. In FIG. 4B block 404 is activated by either of two conditions. First it is activated each time a Type A or a type B message is received. It is also activated by activation of button 10D.

If the message is type A, the program follows the NO path from block 404 and the message is displayed as indicated by block 410. This is the normal type of operation. If the message is a type B or secure message the program goes to block 405 to determine if a security code has in fact been stored in the memory using a type C message. If no security code has been stored, it means that the operator does not want this feature of the system activated and the secure message is displayed as is a type A message.

If a security code has been previously stored in memory using a type C message, block 406 is activated and the display on the pager will be set to "0000". The user will then enter the security code as previously described. This is indicated by block 407 and 408.

If the security code entered by the user matches the stored code, the message is displayed. If the user makes a mistake, as indicated by block 413, he is given three tries. If he enters the code incorrectly more than three tries, block 412, the message is erased from the memory.

The technical description from U.S. Pat. Nos. 4,713,808, 4,897,835 4,885,802, 5,016,273 and 5,065,423 which are referenced above are hereby incorporated herein by reference.

It is noted that while the present invention is herein shown as applied to a system for sending messages to a wrist watch pager, the invention could be applied to sending messages to any other personal message reception device such as to a pocket pager or to the portable telephone that is equipped with a display screen.

The communication computer 101D is herein shown as being connected to only one bank CPU 101C, it should be understood that this computer could be connected to a plurality of such computers. The Bank CPU would normally download information to the communication computer at night when the bank computer has extra time. The communication computer would then send the message to the clearinghouse computer 102 at a designated time so that the user would know that a message received at a particular time was his bank balance.

As shown herein the security code has four digits. Other forms of security code could be used. For example the system could operate such that there is an arbitrary number of digits and the user must enter a number of digits that match the digits stored in the memory using a type C message. Also as shown herein the initial display is all zeros. Alternatively this display could be all stars.

While the invention has been described with respect to a preferred embodiment thereof, it should be understood that various changes in form and detail may be made without departing from the spirit and scope of the invention. The present invention is limited only by the following claims:

I claim:

1. A system including, a plurality of personal message reception devices, each of which has a unique identification number and receives messages, means for sending messages to said personal reception devices, each message being one of a plurality of message types, at least one of said message types being a security code message containing a security code datum and at least one of said message types being a bank balance messages being directed to a personal reception device which has a particular unique identification number whereby a selected security code datum is directed to and stored within a selected message reception device and a selected bank balance datum is directed to and stored within said selected message reception device and said selected message reception device displays a received and stored bank balance datum only upon a user entry matching a received and stored security code datum, a bank computer which has stored therein system users' current bank balance data and which regularly selects for sending bank balance data, and means coupling said bank computer to said sending means to deliver said selected bank balance datum via a selected bank balance message to said selected message reception device.

2. The system recited in claim 1, including, means for storing said security code datum in said personal reception device, means for said user entry of said personal security code datum into said personal reception device by user operation of reception device buttons, and means for only displaying said bank balance datum after said security code datum has been entered by said device buttons.

3. The system recited in claim 1 wherein said personal reception device is a radio pager.

4. The system recited in claim 2 wherein said personal reception device is a radio pager.

5. The system recited in claim 3 wherein said means for sending messages includes means for transmitting messages using a time slot protocol.

6. The system recited in claim 3 wherein said means for sending messages includes means for transmitting messages to said radio pager using a FM subcarrier.

7. A system for regularly transmitting bank balances to radio pagers including, means for sending a plurality of message types to said radio pagers, said radio pagers responding differently to each different message type, said message types including a bank balance message, a security code message, and a remaining normal message defined as being other than one of said balance message and said security code message, means in said radio pager for displaying a received normal message, and means for only displaying the information in a received bank balance message after the user has entered a security code which matches a security code previously transmitted to and stored in said radio pager using a received security code message, whereby bank balance information is not displayed on said pager until the user enters an appropriate security code.

8. The system recited in claim 7 including a plurality of radio pagers each of which have an identification number, and means for transmitting particular messages to particular radio pagers.

9. The system recited in claim 7 wherein messages are transmitted to said radio pagers using a time slot protocol, each time slot of which has a number of fields including a field which indicates one of said plurality of message types, a field which indicates a pager identification number and a field which includes variable data.

10. A system for transmitting normal messages, secure messages, and security code messages to radio pagers, said normal messages being other than one of said secure messages and said security code messages, said system comprising:

means for transmitting message type identification information associated with each message transmitted to one of said pagers, said message type identification information indicating the associated message as being one of said normal messages, one of said secure messages, or one of said security code messages, means for regularly transmitting said secure messages to said radio pagers, means in each of said radio pagers for storing a security code in response to a security code message received and containing said security code, entry means for entering a security code into one of said radio pagers, and means for displaying a secure message on said radio pager only if the security code entered with said entry means matches the security code stored in said radio pager.

\* \* \* \* \*